Jan. 3, 1956  T. O. KOSATKA  2,729,482
FLUID SEAL
Filed Dec. 11, 1952
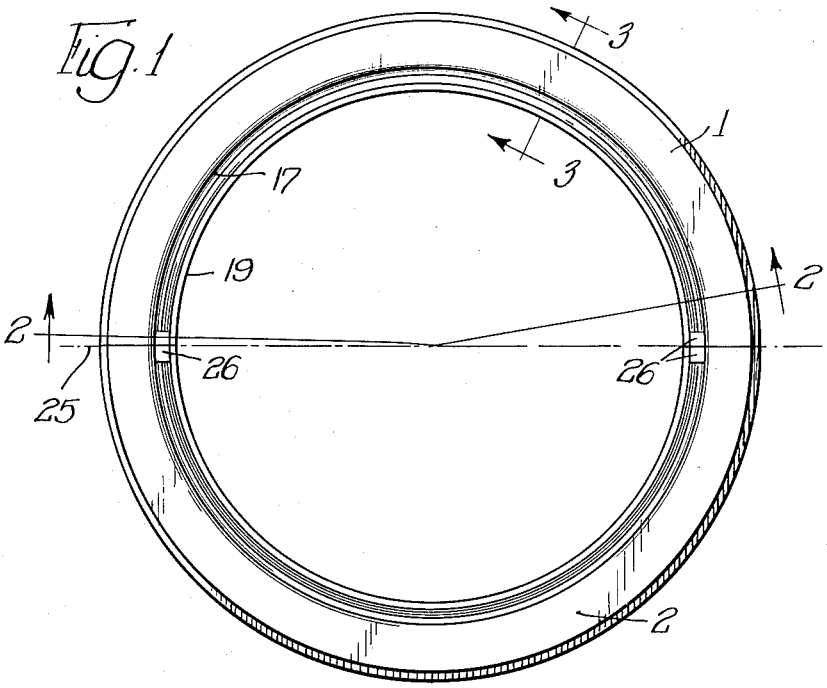
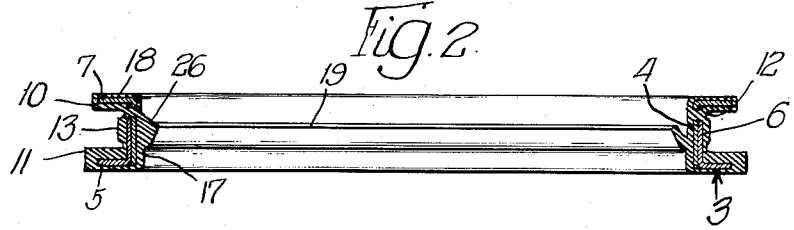
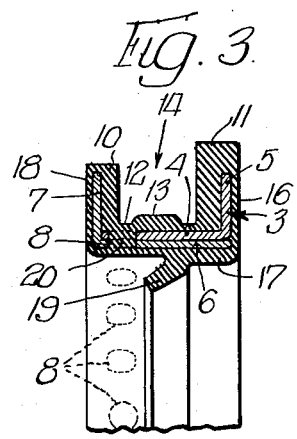
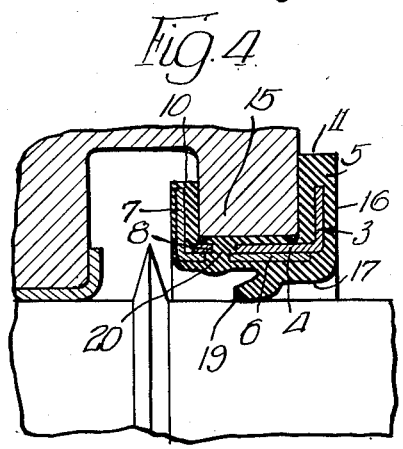
INVENTOR.
Thomas O. Kosatka,
BY George T. Haight +
George H. Simmons
Atty.

United States Patent Office 2,729,482
Patented Jan. 3, 1956

2,729,482
FLUID SEAL

Thomas O. Kosatka, Chicago, Ill., assignor to Victor Manufacturing & Gasket Co., Chicago, Ill., a corporation of Illinois Application December 11, 1952, Serial No. 325,335

4 Claims. (Cl. 288—13)

This invention relates to split seals for preventing the escape of fluids within a housing along a shaft that projects through an aperture in the housing and has for its principal object the provision of a new and improved seal of this kind.

It is a main object of the invention to provide a split seal that can be manufactured at low cost and is capable of maintaining a fluidtight seal between a housing and a shaft for a long period of time without attention.

Another object of the invention is to provide a split seal for the rear main bearing of an internal combustion engine, which seal can be attached to the engine without the use of auxiliary fastening devices, such as bolts or studs.

Further objects of the invention not specifically mentioned here will be apparent from the description and claims which follow, reference being had to the accompanying drawings in which a preferred embodiment of the invention is shown by way of example and in which:

Fig. 1 is a plan view of the seal;

Fig. 2 is a cross sectional view taken substantially along the line 2—2 of Fig. 1, looking in the direction of the arrows;

Fig. 3 is a fragmentary cross sectional view of the seal taken substantially along the lines 3—3 of Fig. 1, looking in the direction of the arrows; and Fig. 4 is a view similar to Fig. 3, showing the seal applied to an engine housing.

In my prior Patent 2,558,183, issued June 26, 1951, there is shown a split seal particularly adapted to sealing the rear main bearing of an internal combustion engine. The seal of this prior patent comprises semi-circular members each consisting of a pair of metallic plates between which is a bridgelike wall of elastomer that is stressed in tension by the engagement of flanges thereon with the housing member and in compression by the housing member, said bridgelike wall including also a shaft engaging sealing lip portion that forms a seal with the shaft.

This prior art seal containing elastomer which is subjected to a multiplicity of stresses and strains in the normal use of the device, while capable of forming a fluidtight seal, is apt to be incapable of maintaining the tightness of that seal over a long period of time, particularly when the housing member to which it is attached is at maximum thickness. The present invention seeks to provide a two-piece sealing structure which improves upon the seal of the above prior patent.

To this end the seal of the present invention preferably consists of a pair of metal reinforcing members as before; however, these metallic members each contain a semi-cylindrical portion and a flange portion extending radially outwardly therefrom, the cylindrical portions being telescoped together and being perforated near one of the flanges. Elastomer covers the inside faces of the flanges and the outside face of one of the semi-cylindrical portions to form an outwardly opening groove which is fitted over the housing member to secure the sealing unit thereon and to form a fluidtight seal therewith. The elastomer also covers the outer faces of the flanges and the inner face of the second semi-cylindrical portion and formed in this latter portion of the elastomer is a sealing lip which engages the shaft to form a fluidtight seal therewith. The elastomer also is projected through the perforations in the semi-cylindrical members to aid in holding the assembly securely together. As a result of this construction, stresses placed upon the seal by its engagement with the housing member are resisted principally by the outer metallic member and elastomer bonded thereto, and any distortion of the sealing unit occasioned by such stresses is not transmitted to the sealing lip, and as a consequence the efficiency of the sealing lip is not impaired. Conversely, stresses imposed upon the elastomer by the engagement of the sealing lip with the shaft are in the main counteracted by the inner metallic member and are not transmitted to the elastomer that secures the sealing unit on the housing member and forms a fluidtight seal therewith.

Referring now to the drawings in more detail, particularly to Figs. 1 to 3, inclusive, the seal of the present invention comprises two semi-circular members indicated generally at 1 and 2, each of which consists of a first metallic member 3 containing a semi-cylindrical portion 4 and a flange portion 5 that projects radially outwardly from one end of the portion 4. A second metallic member consists of a semi-cylindrical portion 6 that is telescoped inside the portion 4 of the first metallic member and a flange portion 7 which projects past the free end of the portion 4 radially outwardly substantially parallel to the flange 5 and terminates on a circle whose diameter is the same as the diameter of the outer end of the flange 5. The semi-cylindrical portions 4 and 6 of these metallic members contain perforations 8 which are located off-center and towards the flange 7.

Fixed to the inner surfaces of the flanges 5 and 7, and the outer surface of the cylindrical portion 4, is an elastomer having radial walls 10 and 11 joined together by a bottom wall 12, in the center of which is a compression ridge 13 that is thicker than the remainder of the wall. Surfaces 10, 11 and 12, together form an outwardly opening groove 14 adapted to be fitted over a flangelike portion 15 of the housing member in the manner shown in Fig. 4.

Also bonded to the metallic members as an integral part of the outer elastomer is an inner elastomer portion having a wall 16 on the outside face of the flange 5, a main body portion 17 on the inside face of the metallic cylindrical portion 6 and a thinner flash face 18 on the outside portion of the flange 7. The main body portion 17 of this latter elastomer is shaped to form a sealing lip 19 that is adapted to engage a shaft in the manner shown in Fig. 4.

Whether or not the outer face of flange 7 is covered by elastomer 18 is immaterial within the teachings of the invention. Actually, in the commercial production of a unit of this kind, during the molding of the elastomer on the metallic parts, a thin wall will usually be formed on this flange as a flash. Such a wall, while it does not enter into the actual functioning of the seal, does serve to protect the metallic part from corrosion or the like occasioned by fluids within the housing coming into contact therewith.

The inner and outer portions of the elastomer are joined together by a plurality of lugs of elastomer 20 which extend through the perforations 8 in the metallic members and serve as keys for resiliently holding the metallic members together.

As will be seen in Fig. 4, when the sealing unit is registered with the flangelike portion 15 of the housing, elastomer faces 10 and 11 are spread laterally and the elastomer between these faces and the flanges 7 and 5 respectively, is compressed. As the housing members are drawn together, the compression ridge 13 is squeezed between the cylindrical inner face of the flange 15 and the semi-cylindrical portions 4 and 6 of the metallic members, the bulk of this compression being resisted by the outer semi-cylindrical member 4 to which this elastomer is bonded. When the bearing members are in final position, the ridge 13 will be displaced laterally engaging all or substantially all of the inner cylindrical face of the flange 15 to form a fluidtight seal therewith, which seal is augmented by the compressed elastomer on the inner and outer faces of the flange.

Should the flange 15 be oversize to such an extent that the forces compressing the elastomer laterally against the flanges 5 and 7 are excessive, the outer metallic member may move laterally to bring the unit into balance. Elastomer lugs 20 provide sufficient resiliency to permit such lateral movements and thus it will be seen that the unit of the present invention retains the feature of resiliency found in the elastomer bridge of my above mentioned prior patent. Forces imposed upon the unit by the engagement of the housing member therewith are resisted by the flanges 5 and 7 and the outer semi-cylindrical portion 4 of the metallic members. Any distortion which may be produced in the unit by these forces is not transmitted to the innermost portion of the elastomer of which the sealing lip 19 is an integral part, and as a result any such resulting distortion does not impair the formation of a fluidtight seal with the shaft.

As will be seen in Fig. 1, the two semi-circular portions 1 and 2 of the sealing unit part upon the diameter 25 and adjacent this parting line are walls 26 which extend between the main body 17 and the sealing lip 19. These walls 26 being relatively short do not greatly impair the resiliency of the sealing lip and they do aid in forming a fluidtight seal at the junctions of the two sealing units as the housing members are being drawn together.

The unit of the present invention constitutes an improvement of my prior patent in that the elastomer compressed by the housing member is compressed between the cylindrical wall of that member and the telescoped semi-cylindrical portions of the sealing unit. This elastomer is displaced by such forces into tight seal forming engagement therewith, and being wholly confined is incapable of maintaining such fluidtight seal for a long period of time. The lateral elasticity of my former patent is retained and distortions which may develop as a result of the movement of the housing members into final position are absorbed within the sealing member in such manner as not to impair the efficiency of the sealing lip. As a result, the improved structure of the present invention is capable of maintaining a satisfactory seal over a longer period of time than have any of the prior art devices of which I am aware.

If desired, the shaft engaging face of the sealing lip may be covered by a friction reducing fabric, as will be well understood by those skilled in the art.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What is claimed is:

1. A seal for closing the space between complementary housing members which are drawn together to form a circular opening through which a rotatable shaft projects concentrically to seal a fluid within said housing and around said shaft, comprising: a pair of sealing members each consisting of a pair of L-shaped metallic members telescoped together and forming a U-shaped channel that opens radially outwardly; an elastomer element bonded to the bottom and sides of said channel and adapted to engage the housing members and to form a seal therewith, a second elastomer element, integral with the first elastomer element and bonded to the outer radial faces of both of said metallic members and to the inner face of the inner one of the telescoped portions of said metallic members and containing a sealing lip adapted to engage the shaft and to form a seal therewith, said telescoped portions of said metallic members containing perforations registered together, and a plurality of elastomer lugs integral with said first and second elastomer elements and disposed in said perforations in said metallic elements to aid in securing the assembly together.

2. A seal for closing the space between complementary housing members which are drawn together to form a circular opening through which a rotatable shaft projects concentrically to seal a fluid within said housing and around said shaft, comprising: a pair of semi-circular sealing members each consisting of a first metallic member containing a semi-cylindrical portion and a flange that projects radially outwardly from one end of said semi-cylindrical portion; a second metallic member containing a semi-cylindrical portion telescoped within the semi-cylindrical portion of the first metallic member and a flange that projects radially from one end thereof past the end of the semi-cylindrical portion of said first metallic member and therebeyond; and an elastomer member encompassing said metallic members, bonded thereto and forming therewith an outwardly opening channel adapted to engage the housing members to secure the seal thereto and to form a seal therewith, and forming also a sealing lip projecting radially inwardly from said semi-cylindrical portions and adapted to engage the shaft and to form a seal therewith.

3. A seal for closing the space between complementary housing members which are drawn together to form a circular opening through which a shaft projects concentrically, comprising: a pair of semi-circular sealing members each consisting of a first metallic member containing a perforated semi-cylindrical portion and a flange projecting radially outwardly from one end of said portion; a second metallic member containing a perforated semi-cylindrical portion and a flange projecting radially outwardly from one end of said portion past the unflanged end of the cylindrical portion of said first metallic member, said semi-cylindrical portions being telescoped together and the perforations therein aligned with each other and being disposed adjacent to the flange on said second member; an elastomer bonded to said metallic members and comprising a portion forming a thin wall on the inside face of said second flange, a portion forming a rib on the outer face of said first cylindrical member, a portion forming a thicker wall on the inside face of said first flange, said portions together forming an outwardly opening channel adapted to engage the housing and to form a seal therewith, a portion disposed against the outside faces of said flanges and extending across the inside face of said second cylindrical portion, a portion projecting radially inwardly from said latter portion and forming a lip adapted to engage the shaft and to form a seal, and a plurality of lug portions extending through said perforations and joining together the inner and outer cylindrical portions of said elastomer.

4. A seal as claimed in claim 3 in which the lip is disposed substantially in the median plane of the cylindrical portion of the second metallic member and in which the perforations in the metallic members are located between that median plane and the flange on the second metallic member.

References Cited in the file of this patent

UNITED STATES PATENTS

| | | |
|---|---|---|
| 2,330,104 | Antonelli | Sept. 21, 1943 |
| 2,480,116 | Brummer | Aug. 30, 1949 |
| 2,558,183 | Kosatka | June 26, 1951 |
| 2,647,002 | Brummer | July 28, 1953 |

FOREIGN PATENTS

| | | |
|---|---|---|
| 544,732 | Great Britain | Apr. 24, 1942 |